Dec. 14, 1954

C. S. WILLIAMS 2,697,160

DIRECT CURRENT ARC WELDING

Filed Oct. 10, 1951

WITNESSES:
Robert O. Baird
Ross Rogers Jr.

INVENTOR
Clifton S. Williams.
BY
Hyman Diamond
ATTORNEY

United States Patent Office 2,697,160
Patented Dec. 14, 1954

2,697,160

DIRECT CURRENT ARC WELDING

Clifton S. Williams, Pittsburgh, Pa., assignor to Westinghouse Electric Corporation, East Pittsburgh, Pa., a corporation of Pennsylvania Application October 10, 1951, Serial No. 250,600

19 Claims. (Cl. 219—8)

My invention relates to electric arc welders and particularly to arc welders in which the weld is produced by a D. C. arc between a non-consumable electrode and work within an inert gas. D. C. inert-gas-shielded arc welders are particularly suitable for welding such metals as aluminum and aluminum alloys which oxidize readily, mild carbon steel, stainless steel, copper and copper alloys. Such suitability is not intended in any respect to limit the scope of my invention.

With respect to the potential relationship of the work and the welding electrode, D. C. arc-welding is classified as straight polarity and reverse polarity. In straight polarity welding, the welding electrode is maintained negative with respect to the workpiece, thus being the electron emissive component. In reverse polarity welding the work is maintained negative and the electrode positive.

Straight polarity welding has one important advantage. An operator may readily weld along a predetermined line since the arc does not tend to wander appreciably from the desired weld line. However, the surfaces to be welded particularly if a metal such as aluminum is involved must be cleaned with great care and requires substantial skill to remove the oxidation products and thereby permit the formation of a strong weld. This disadvantage arises particularly in welding aluminum.

Reverse polarity welding is subject to two important difficulties. The electrode tends to overheat causing the formation of a large drop of electrode material which is likely to fall into the metal and contaminate the weld, or the arc tends to wander, thus preventing an accurately placed weld. On the other hand, reverse polarity permits the welding of oxidized surfaces (such as aluminum) without detrimental effects. Reverse polarity welding cleans up the weld and the adjacent area, thus permitting the formation of a good weld. It leaves a clean weld bead and saves the time which would otherwise be used in cleaning the weld.

Reverse polarity welding is thus generally preferred to straight polarity but introduces certain problems. Patent No. 2,473,601, issued June 21, 1949, to R. R. Lobosco, attempts a solution to this problem. He employs the reverse polarity connection, accepting as an asset the fact that the electrode is subjected to substantial heating. He prefers that the work run cooler. He attempts to overcome the difficulty due to the wandering of the arc when reverse polarity is used by coating the surface to be welded along the line of the weld with an emissive coating which causes the arc to tend to form between the welding electrode and the emissive coating.

I have found that the Lobosco arrangement is not completely satisfactory since it requires that the weld area be covered with emissive coating. The overheating of the weld electrode is also a marked disadvantage. Lobosco's arrangement allows the formation of droplets of electrode material, which, when the electrode becomes severely overheated, may drop into the work and introduce undesirable impurities. Further, the Lobosco arrangement leaves residue of the emissive coating after the weld is formed. These residual impurities either must be removed or they will form nuclei for corrosion.

It is accordingly an object of my invention to provide a D. C. arc-welder which shall have the above described advantages both of straight polarity and reverse polarity without their respective above described disadvantages.

It is a further object of my invention to provide a welder which shall be capable of making a sound weld along a predetermined line.

Another object of my invention is to provide a welder which shall operate satisfactorily but shall not present the hazard of electrical shock to an operator.

It is still another object of my invention to provide a welder having a low manufacturing and maintenance cost which shall be capable of forming a sound weld.

It is a still further object of my invention to provide a direct current welder which is subject to the drawbacks of neither direct polarity nor reverse polarity welding.

It is an ancillary object of my invention to provide a novel electronic circuit.

My invention arises from concepts developed as a result of experimental work on this problem. These concepts have their basis in the phenomena which underlie arc welding of this type and will not be discussed.

One of the principal disadvantages of reverse polarity welding is the great amount of heat liberated in the electrode. If the electrode is made small it tends to overheat and melt and introduce impurities into the weld. If the electrode is made large to withstand and dissipate the great amount of heat, the electrode tip is so large that the arc tends to wander. The severity of this problem is realized when it is considered that the electrode is subjected to approximately ten times as much heating in reverse polarity welding than in straight polarity. If it is desired that the electrodes reach the same temperature for either straight or reverse polarity, the reverse polarity electrode must have approximately ten times the area required for the straight polarity electrode. The diameter of the electrode then must be increased more than three times, increasing by approximately three times the distance transverse to the weld over which the arc tends to wander.

In alternating current welding the welding electrode operates both at straight and reverse polarity and the heating effect at the electrode is somewhat reduced. But alternating current welding presents its own difficulties. It has been found in A. C. arc welding that there is a rectifying effect in the arc. The current flowing through the arc is then, in effect, an alternating current superimposed on a direct current. Such a current flowing through the secondary of the welding transformer tends to saturate and excessively heat the transformer and decrease its power handling capacity. A large and costly transformer must then be used. I have found also that the apparatus imposes a limit on the amount of the D. C. component, and that the power flow during straight polarity half periods must not be more than three times as much as the power flow during reverse polarity. If a greater ratio than that is employed, the demands on the power system become too severe to handle. This arises from the presence of peaks in the arc-voltage wave which are many times the normal maximum voltage of the welding transformer.

I have found that the advantages of direct and reverse polarity welding may be achieved without attendant disadvantages either of D. C. welding or A. C. welding by impressing between the electrode and the work straight polarity potentials having reverse polarity peaks of relatively short duration superimposed thereon. The duration of the peaks may vary over a wide range which will depend on the material to be welded and on the composition of the welding rod and such range is within the broad scope of my invention. Specifically I have found that a strong and clean weld can be formed in aluminum if the energy flow during straight polarity is approximately twenty times the reverse polarity energy flow.

In apparatus according to my invention, the welding electrode is supplied with current sufficient to weld at straight polarity potential, but a separate pulsing circuit is provided to pass current of reverse polarity during short intervals of time. I have achieved satisfactory results through the use of a pulsing circuit driven from a 60-cycle source to provide 60 pulses of reverse polarity each second. Even better results are obtained if there are more than 60 pulses a second. To achieve this effect the circuit may be driven by a power source of a frequency greater than 60 cycles, or it may be provided by a number of pulsing circuits, each driven from a 60-cycle source.

The novel features that I consider characteristic of my invention are set forth with particularity in the appended claims. The invention itself, however, as to its organization and its method of operation, together with additional objects and advantages thereof, will be understood from the following description of specific embodiments when read in connection with the accompanying drawing, in which:

Figure 1:
Figures 1, 2, 3 and 4 are schematic drawings of embodiments of my invention.

The apparatus shown in Fig. 1 includes a welding electrode 13 and work 6 supplied from a D. C. source (not shown) through the terminals 7 and 9. A choke coil 11 is connected between the negative terminal 7 and the welding electrode 13 to suppress the flow of alternating current through the D. C. supply. Terminals 15 and 17 are provided for connection to a source of alternating current. A current limiting inductor 19 is connected to one of the A. C. terminals. A first capacitor 21 is connected between one A. C. terminal 17 and the inductor 19. A saturable reactor 23 and second capacitor 25 are connected between the inductor 19 and the welding electrode 13. The second capacitor 25 prevents the flow of direct current into the A. C. circuit. A resistor 27 is connected to one terminal 17 of the A. C. source and to a point between the saturable reactor 23 and the capacitor 25.

In operation, the D. C. source impresses on the welding electrode 13 a voltage sufficient to cause a welding current to flow through it. During each half cycle, the A. C. source charges the first capacitor 21 and saturates the saturable reactor 23. As the saturable reactor is saturated, its impedance greatly decreases, and it permits the discharge of the first capacitor 21 through the saturable reactor 23, the second capacitor 25 and the welding electrode 13. During one half cycle, this pulse of current resulting from the discharge of the first capacitor 21 is of the same polarity as the D. C. source. During the other half cycle, this pulse is of opposite polarity to that of the D. C. source, and it introduces a period of reverse polarity which cleans the weld and permits the formation of a satisfactory weld.

Figure 2:
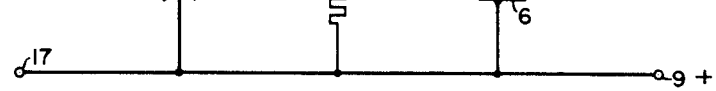

Fig. 2 shows a different arrangement in which the D. C. source (not shown) is connected between the welding electrode and the work in the same manner as before. A resistor 29, a rectifier 31 and a capacitor 21 are connected across the A. C. source. A grid-controlled rectifier 33 is connected to the point between the rectifier 31 and the capacitor 21 and to the welding electrode 13 in a sense such that it carries current of polarity opposite to that of the D. C. source. The grid 35 of the rectifier 33 is connected through a source 37 of bias voltage and the secondary 39 of a firing transformer 41 to its cathode 43. The primary winding 45 of the transformer 41 is connected to a source of alternating current (not shown).

In operation, the rectifier 31 carries current through the current limiting resistor 29 to charge the capacitor 21. At the proper instant, the firing transformer 41 renders the grid control rectifier 33 conductive to dump the capacitor charge through the welding electrode 13, thus providing a sudden pulse reverse polarity current through the welding electrode. The pulse of current from the capacitor 21 is then impressed once during each cycle of the A. C. source to provide a pulse of reverse polarity current sufficient to maintain the clean condition of the weld.

Figure 3:
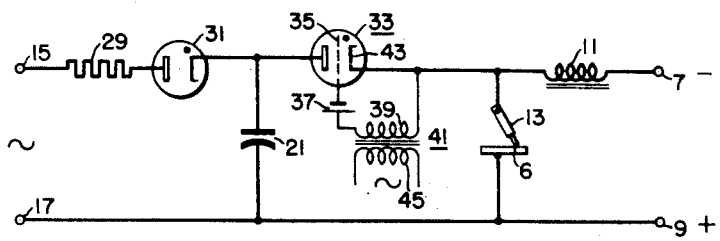

Fig. 3 shows a different circuit in which the D. C. source is connected to the welding electrode in the same manner as in Figs. 1 and 2. A current limiting inductor 47 and a capacitor 21 are connected between the terminals of the A. C. source. An ignitron rectifier 49 is connected from the point between the inductor 47 and the capacitor 21 to the welding electrode 13, in such an orientation as to conduct current of polarity opposite to that provided by the D. C. source. A firing valve 50 is connected between the anode 51 and firing electrode 54 of the ignitron 49. The firing valve 50 is fired in the same manner as that shown for the grid-controlled rectifier 33 shown in Fig. 2. This arrangement operates in the same manner as that shown in Fig. 2 except that the constants of the inductor 47 and capacitor 21 may be so adjusted that they are resonant at the frequency of the A. C. source. If their values are so chosen, the voltage impressed on the capacitor 21 may be greater than the maximum voltage impressed by the A. C. source and the welder is capable of providing a high voltage pulse to the welding electrode 13, even though a high voltage source is not used. The use of a high voltage pulse facilitates initiation of the arc.

Figure 4:
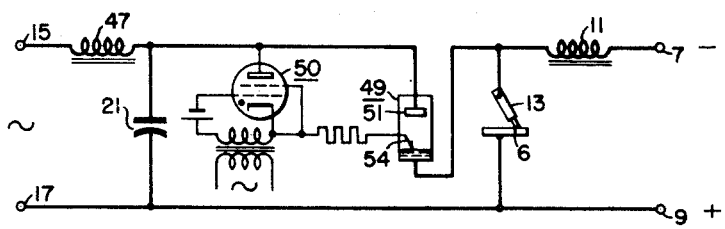

Fig. 4 shows a modification of my circuit in which the D. C. source is connected to the welding electrode in the same manner as in the other views. A current limiting inductor 47, a resistor 53 and a first capacitor 55 are connected across the alternating current source. A second capacitor 75 is connected from a point between the current limiting inductor 47 and the resistor 53 to the positive terminal 9 of the D. C. source. An ignitron 49 is connected from the point between the current limiting inductor 47 and resistor 53 to one terminal 17 of the A. C. source. The firing valve 50 is connected between the anode 51 and firing electrode 54 of the ignitron 49. The control grid 57 of the firing valve 50 is connected to a point between the resistor 53 and the first capacitor 55. The resistor 53 and the first capacitor 55 are employed as a firing circuit for the firing valve 50. In the circuit of Fig. 4, the capacitor 75 charges through the welding arc and only while the welding arc is established. At the proper instant, the firing valve causes the ignitron to become conductive to discharge the capacitor through the welding electrode 13.

It is to be noted that in this circuit also the current limiting inductor 47 and the capacitor 75 may be so dimensioned that they are resonant at the frequency of the power source. Then the capacitor may be charged to a voltage higher than that of the A. C. source. However, since it is charged only while the arc exists, it does not present a high open circuit voltage which might subject the welding operator to a shock hazard. It, nevertheless, provides a voltage sufficient to provide a reverse polarity pulse which will clean the surface to be welded and allow the formation of a satisfactory weld.

Figure 5:
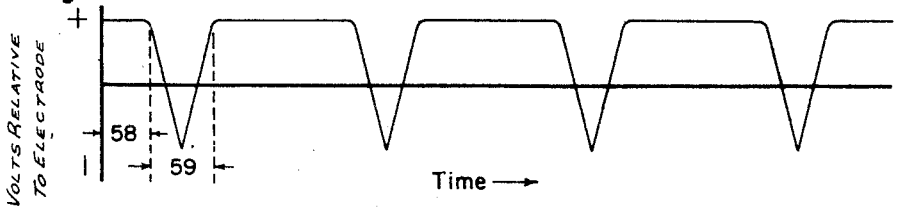
Fig. 5 is a curve showing voltage in the arc as a function of time.

Fig. 5 shows a graph of the voltage between the welding electrode and the workpiece as a function of time. The voltage of the work relative to the electrode is plotted as ordinate; time as abscissa. The distance along the ordinate above the line represents a straight polarity voltage, while the distance on the ordinate below the abscissa represents reverse polarity voltage. The voltage conditions shown are those experienced when the circuits of Figs. 2, 3 and 4 are used. There is a period 58 during which straight polarity potential is impressed followed by a short pulse 59 of reverse polarity resulting from the discharge of the capacitor 21. This cycle is repeated at a rate determined by the frequency of the A. C. source. It is also possible to connect two or more capacitors with their charging and discharging circuits to the welding electrode in order to provide more pulses per minute than there are cycles in the A. C. source.

The relationship between the amplitudes and the durations of the straight and reverse polarity voltages may vary over a reasonable range but the time integral of the reverse polarity voltage should be small compared to the time integral of the straight polarity voltage. In general the reverse polarity should have sufficient magnitude and should persist for sufficient time to produce the desired cleaning of the surface but these parameters should not be so large as to cause the welding electrode to suffer excessive heating. Satisfactory results are obtained in the welding of aluminum with the time integral of the reverse polarity voltage of the order of $\frac{1}{20}$ of the time integral of the straight polarity voltage.

Satisfactory results have been obtained in the practice of my invention with apparatus having the following specific structure:

*Fig. 1*

| | |
|---|---|
| Potential 15—17 | 110–220 volt 60 cycle. |
| Inductance 11 | 20 to 60 millihenrys. |
| Reactor 23 | 1 ohm D. C., saturates at 125 v. |
| Resistor 27 | 700 ohms. |
| Capacitor 25 | 40 to 100 microfarads. |
| Inductance 19 | 100 millihenrys. |

Fig. 2

| | |
|---|---|
| Potential 15—17 | 100–220 volt 60 cycle. |
| Resistor 29 | 10–50 ohms. |
| Rectifier 31—866A | |
| Valve 33—676 | |
| Capacitor 21 | 20 to 140 ohms. |
| Battery 37 | |
| Inductance 11 | 20 to 60 millihenrys. |

Fig. 3

| | |
|---|---|
| Potential 15—17 | 110–220 volt 60 cycle. |
| Inductance 47 | 52 millihenrys. |
| Capacitor 21 | 120 microfarads. |
| Valve 50—632A. | |
| Ignitron 4—681/686. | |
| Inductance 11 | 20 to 60 millihenrys. |

Fig. 4

| | |
|---|---|
| Potential 15—17 | 110–220 volt 60 cycle. |
| Inductance 57 | 52 millihenrys. |
| Capacitor 21 | 120 microfarads. |
| Valve 50—632A. | |
| Ignitron 49—681/686. | |
| Inductance 11 | 20 to 60 millihenrys. |

My invention is particularly suitable for the welding of metals such as aluminum with a tungsten electrode operating in an inert gas shield. In its broader aspects my invention is applicable to welding of metals such as iron or steel in the absence of an inert-gas shield. Broadly it is also applicable to consumable electrode welding in which the control of the amplitude and duration of the reverse polarity pulses may serve to control the rate at which the melted electrode flows. Such application of reverse-polarity pulses then is within the scope of my invention.

While I have shown and described certain specific embodiments of my invention, I am fully aware that many modifications thereof are practicable. My invention therefore is not to be restricted except insofar as is necessitated by the prior art and by the spirit of the appended claims.

I claim as my invention:

1. Apparatus for welding a workpiece with current from a source of direct current, comprising a welding electrode, first means for maintaining said electrode negative with respect to said workpiece for a first predetermined period of time, second means for maintaining said welding electrode positive with respect to said workpiece for a second period of time short with respect to said first period of time, and third means for causing said first and second means to operate alternately.

2. Apparatus set forth in claim 1 in which said first means is a source of direct current and said second and third means are a pulsing mechanism which is so adjusted that it causes current of polarity opposite to that of the direct current source to flow for said second period of time.

3. Apparatus set forth in claim 1 in which said first means is a source of direct current and said second and third means are a pulsing mechanism comprising terminals for impressing an alternating current voltage, an impedance connected to the first of said terminals, a capacitor connected between the second of said terminals and the impedance, connections between said second terminal and said workpiece, connections including a saturable reactor connected between said impedance and said welding electrode.

4. Apparatus set forth in claim 1 in which said first means is a source of direct current and said second and third means are a pulsing mechanism comprising terminals for impressing an alternative current voltage, an inductor connected to the first of said terminals, a capacitor connected between the second of said terminals and the inductor, connections between said second terminal and said workpiece, connections including a saturable reactor connected between said inductor and said welding electrode, said saturable reactor being so dimensioned that it can become saturated with said alternating current.

5. Apparatus set forth in claim 1 in which said first means is a source of direct current and said second and third means are a pulsing mechanism comprising terminals for impressing an alternating current voltage, an impedance connected to the first of said terminals, a rectifier and a capacitor connected between said impedance and the second of said terminals, an electric valve connected between the point between said rectifier and said capacitor and said welding electrode, means for firing said electric valve at a predetermined point in each cycle of said alternating current source and connections between said second terminal and said workpiece.

6. Apparatus set forth in claim 1 in which said first means is a source of direct current and said second and third means are a pulsing mechanism comprising terminals for impressing an alternative current voltage, an impedance connected to the first of said terminals, a rectifier and a capacitor connected between said impedance and the second of said terminals, an electric valve connected between the point between said rectifier and said capacitor and said welding electrode, means for firing said electric valve at a plurality of points in each cycle of said alternating current source and connections between said second terminal and said workpiece.

7. Apparatus set forth in claim 1 in which said first means is a source of direct current and said second and third means are a pulsing mechanism comprising terminals for impressing an alternating current voltage, an impedance connected to the first of said terminals, a capacitor connected between the second of said terminals and the impedance, connections between said second terminal and said workpiece, an electric valve connected between the point between said impedance and capacitor and said welding electrode and means for firing said valve at least at one predetermined point in each cycle of said alternating current source.

8. Apparatus set forth in claim 1 in which said first means is a source of direct current and said second and third means are a pulsing mechanism, comprising terminals for impressing an alternating current voltage, an inductor connected to the first of said terminals, a capacitor connected between the second of said terminals and the inductor, connections between said second terminal and said workpiece, an electric valve connected between the point between said inductor and capacitor and said welding electrode and means for firing said valve at least at one predetermined point in each cycle of said alternating current source, said inductor and said capacitor being so dimensioned that they are near resonance at the frequency of said alternating current source.

9. Apparatus set forth in claim 1 in which said first means is a source of direct current and said second and third means are a pulsing mechanism comprising terminals for impressing an alternating current voltage, an impedance connected to the first of said terminals, a capacitor connected between the impedance and the workpiece, an electric valve connected between the point between said impedance and said capacitor and said welding electrode and means for firing said electric valve at least once in each cycle of said source of alternating voltage.

10. Apparatus set forth in claim 1 in which said first means is a source of direct current and said second and third means are a pulsing mechanism comprising terminals for impressing an alternating current voltage, an inductor connected to the first of said terminals, a capacitor connected between the inductor and the workpiece, an electric valve connected between the point between said inductor and said capacitor and said welding electrode, and means for firing said electric valve at least once in each cycle of said source of alternating voltage, said inductor and said capacitor being so dimensioned that they are near resonance at the frequency of said alternating current source.

11. Apparatus for welding aluminum or its alloys with a non-consumable welding rod operating in an inert-gas shield comprising in combination means for impressing a straight polarity potential between said rod and said aluminum and means for superimposing on said straight polarity potential pulses of reverse polarity potential of greater amplitude than the amplitude of said straight polarity potential, the duration of said pulses being short compared to the intervals between said pulses.

12. Apparatus for welding aluminum or its alloys with a non-consumable welding rod operating in an inert-gas shield comprising in combination means for impressing a straight polarity potential between said rod and said aluminum and means for superimposing on said straight polarity potential pulses of reverse polarity potential of greater amplitude than the amplitude of said straight polarity potential, the time integral of the reverse polarity potential impressed during said pulses being small compared with the time integral of the straight polarity potential intervening between pulses.

13. Apparatus for welding aluminum or its alloys with a non-consumable welding rod operating in an inert-gas shield comprising in combination means for impressing a straight polarity potential between said rod and said aluminum and means for superimposing on said straight polarity potential pulses of reverse polarity potential of greater amplitude than the amplitude of said straight polarity potential, the time integral of the reverse polarity potential impressed during said pulses being no greater than $\frac{1}{20}$ of the time integral of the straight polarity potential intervening between pulses.

14. Apparatus for controlling the supply of current from a direct current source to a welding electrode for arc welding work comprising in combination means adapted to connect the negative terminal of said source to said electrode and the positive terminal to said work; terminals for connection to an alternating current source; a capacitor connected across said terminals; and means including a saturable reactor for connecting said capacitor between said electrode and said work.

15. Apparatus for controlling the supply of current from a direct current source to a welding electrode for arc welding work comprising in combination means adapted to connect the negative terminal of said source to said electrode and the positive terminal to said work; a capacitor; means for charging said capacitor to a D. C. potential so that one of its plates is positive and the other negative; an electric discharge device having an anode and a cathode; means connecting said anode to the positive plate of said capacitor; means connecting said cathode to said electrode; means connecting the negative plate of said capacitor to said work and means for rendering said discharge device conductive at intervals to discharge said capacitor.

16. Apparatus for controlling the supply of current from a direct current source to a welding electrode for arc welding work comprising in combination means adapted to connect the negative terminal of said source to said electrode and the positive terminal to said work; a capacitor; charging means for said capacitor; means for connecting one plate of said capacitor to said work; means for connecting the other plate of said capacitor to said charging means; an electric discharge device having an anode and a cathode; means for connecting said anode to said other plate; means for connecting said cathode to said electrode and means for rendering said device conductive at intervals to discharge said capacitor.

17. Apparatus for controlling the supply of current from a direct current source to a welding electrode for arc welding work comprising in combination; a capacitor; a pair of terminals adapted to be connected to a source of alternating potential; means for charging said capacitor from said source to a potential such that one plate of said capacitor is positive and the other negative, said charging means including reactance means in series with said capacitor and constituting therewith an anti-resonant circuit tuned to the frequency of said source; and means for discharging said capacitor at intervals in a series circuit including in succession said one plate, said electrode, said work and said other plate.

18. The method of arc welding work with a welding electrode which comprises impressing a straight polarity potential between said electrode and said work adequate to maintain an arc between said electrode and said work and superimposing on said straight polarity potential, a periodic potential of relatively short duration and of polarity and magnitude such that a net potential of reverse polarity is impressed between said electrode and said work during said short duration at the periodicity of said periodic potential.

19. The method of arc welding aluminum with a non-consumable welding electrode in an inert gas shield which comprises impressing a straight polarity potential between said electrode and said work adequate to maintain an arc between said electrode and said work and superimposing on said straight polarity potential, periodic potential of relatively short duration and of polarity and magnitude such that a net potential of reverse polarity is impressed between said electrode and said work during said short duration of the periodicity of said short duration potential.

References Cited in the file of this patent

UNITED STATES PATENTS

| Number | Name | Date |
|--------|------|------|
| 2,139,160 | Hebeler | Dec. 6, 1938 |
| 2,173,450 | Larsen et al. | Sept. 19, 1939 |
| 2,276,636 | White | Mar. 17, 1942 |
| 2,472,323 | Welch | June 7, 1949 |